3,230,233
NOVEL SUBSTITUTED 2,3-DIHYDRO-9-CARBAMOYLOXYMETHYL - 6 - METHYL-PYRROLO[1,2-a] INDOLE-5,8-DIONES

Walter Edward Meyer, Suffern, and John Halley Mowat, Pearl River, N.Y., assignors to American Cyanamid Company, Stamford, Conn., a corporation of Maine
No Drawing. Filed Mar. 4, 1964, Ser. No. 349,464
7 Claims. (Cl. 260—319)

This invention relates to novel antibacterial substances which may be represented by the following general formula:

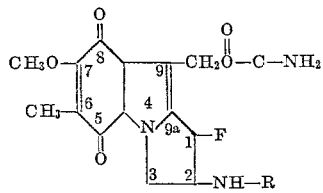

wherein R is hydrogen or lower alkyl. Suitable lower alkyl groups contemplated by the present invention are those having up to about 6 carbon atoms such as, for example, methyl, ethyl, isopropyl, n-propyl, isobutyl, n-butyl etc.

The novel 1-fluorodesoxy apo mitomycin A and the N-(lower alkyl)-1-fluorodesoxy apo mitomycin A derivatives of the present invention are yellow colored crystalline solids having weakly basic properties. They are relatively insoluble in water, ethyl ether and petroleum ether but are relatively soluble in methanol, ethanol, dimethylformamide, and the like. The infrared and ultraviolet absorption patterns are characteristic of the new compounds and provide a preferred means of distinguishing and identifying the novel compounds.

Since the novel compounds of the present invention possess basic properties, they form non-toxic acid-addition salts with a variety of organic and inorganic salt-forming reagents. Thus, acid-addition salts formed by admixture of the organic free base with an acid, suitably in a neutral solvent, are formed with such acids as sulfuric, phosphoric, hydrochloric, hydrobromic, citric, lactic, tartaric, acetic, benzoic and related acids. For purposes of this invention, the free bases are equivalent to their non-toxic acid-addition salts.

The novel antibacterial substances of the present invention may be prepared by reacting *either* (1) mitomycin A or N-(lower alkyl) mitomycin A derivatives *or* (2) anhydro apo mitomycin A or N-(loweralkyl) anhydro apo mitomycin A derivatives with hydrogen fluoride. This cleavage of the aziridine ring (coupled with introduction of a 9,9a double bond in the case of 9a-methoxy series of starting materials) may be brought about with the starting compound either in the solid state or dissolved in a suitable inert anhydrous solvent such as methylene chloride, chloroform, tetrahydrofuran, glycol dimethyl ether, and the like; and the hydrogen fluoride may be either in the liquid or gaseous state. For good yields, exclusion of moisture from the reaction mixture is desirable. The reaction may be carried out at temperatures ranging from −50° C. to 30° C. and preferably at about 0° C. When the reaction is completed, which ordinarily occurs after a period of time of from about 1 to about 10 minutes, excess hydrogen fluoride and solvent may be conveniently removed by evaporation and the product may be recovered from the residue by conventional methods such as crystallization, solvent extraction, partition-column chromatography, and the like.

As indicated hereinabove, the novel compounds of the present invention may be prepared from mitomycin A and N-(lower alkyl) mitomycin A derivatives which may be represented by the following formula:

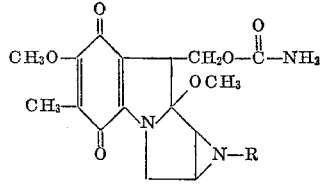

wherein R is hydrogen or lower alkyl. Mitomycin A (wherein R is hydrogen in the above general formula) is a novel antibiotic and is described by Hata, et al. in J. Antibiotics Ser. A., IX, 4, 141 (July 1956). The N-(lower alkyl) mitomycin A derivatives may be conveniently prepared by alkylation of mitomycin A with lower alkyl halides. Preferably, an inert organic solvent such as acetone, dimethylformamide, dioxane or dimethylsulfoxide is used in the presence of a mild alkali, e.g. sodium bicarbonate, anhydrous sodium carbonate or silver oxide. The reaction may be carried out at temperatures ranging from about 0° C. to about 50° C. and preferably at about room temperature, e.g. about 25° C.; and for a period of time of from about 1 to about 8 hours. To minimize degradation, it is desirable to conduct these alkylations under mild conditions.

Alternatively, the novel compounds of the present invention may be prepared from anhydro apo mitomycin A or N-(lower alkyl) anhydro apo mitomycin A derivatives which may be represented by the following general formula:

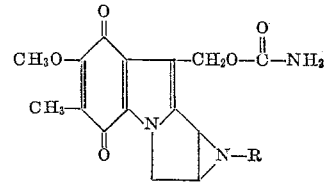

wherein R is hydrogen or lower alkyl. Anhydro apo mitomycin B (wherein R is methyl in the above general formula) may be prepared from mitomycin B as follows: Mitomycin B is dissolved in a suitable polar solvent, usually dimethylformamide or dimethylacetamide, and the solution is contacted with hydrogen in the presence of a noble metal catalyst, preferably finely-divided metallic palladium or other metal of the platinum family. The pure metal may be used or the catalyst may be suspended on one of the common carriers such as finely-divided alumina, activated charcoal, diatomaceous earth, etc. The hydrogenation may be carried out at temperatures ranging from about 0° C. to about 50° C. and preferably at about room temperature, e.g., about 25° C. and at hydrogen pressures of about one atmosphere. A concentration of catalyst of at least 1% by weight of the starting material is necessary and up to about 100% by weight may be used, 10–20% is usual. The hydrogenation is usually carried out until one mole of hydrogen has been absorbed, at which time the rate of absorption tends to diminish. Some caution must be exercised in not continuing the hydrogenation for an undue length of time as further and undesirable reductions may take place.

After completion of the hydrogenation, the reduced product is recovered by any desired means as by removal of the catalyst and concentration of the solution. The reduced product is then oxidized to anhydro apo mitomycin B with air, oxygen, benzoquinone or similar oxidizing agents and the final product may be recovered from the reaction mixture by filtration, washing with alcohol, and vacuum drying. The final product may be purified by recrystallization from ethanol, pyridine or dimethylformamide in a standard manner.

The N-(lower alkyl) anhydro apo mitomycin A derivatives may be conveniently prepared from anhydro apo mitomycin A by alkylation with lower alkyl halides (or by reduction and oxidation of the N-(lower alkyl) mitomycin A derivatives previously described). Preferably, an inert organic solvent such as dimethylformamide, dioxane or dimethylsulfoxide is used in the presence of a mild alkali, e.g. sodium bicarbonate or silver oxide. The reaction may be carried out at temperature ranging from about 0° C. to about 50° C. and preferably at about room temperature, e.g. about 25° C.; and for a period of time ranging from about 1 to about 8 hours. To minimize degradation, it is desirable to conduct these alkylations under mild conditions.

The novel compounds of the present invention are useful as antibacterial agents and possess broad-spectrum antibacterial activity in vitro against a variety of standard laboratory microorganisms. The antibacterial spectrum of typical compounds of the present invention, representing the amount required to inhibit the growth of various typical bacteria, was determined in a standard manner by the agar-dilution streak-plate technique which is commonly used in testing new antibiotics. The minimal inhibitory concentrations expressed in micrograms per milliliter of 1-fluorodesoxy apo mitomycin B against various test organisms are set forth in Table I below. For comparison purposes, the antibacterial spectrum of chlortetracyline hydrochloride is also included.

TABLE I (1) N-methyl-1-fluorodesoxy apo mitomycin A[1].
(2) Chlortetracycline hydrochloride.

| Organism | (1) | (2) |
|---|---|---|
| Mycobacterium smegmatis ATCC 607 | 25 | 0.4 |
| Staphylococcus aureus ATCC 6548P | 1.5 | 0.8 |
| Sarcina lutea PCI 1001; ATCC 9341 | 1.5 | 0.8 |
| Bacillus subtilis ATCC 6633 | 0.2 | 0.2 |
| Streptococcus faecalis ATCC 8043 | 6.2 | 0.8 |
| Streptococcus pyogenes C 203—β Hemolytic strep., Group A | 0.2 | 0.2 |
| Streptococcus pyogenes NY 5 | 0.4 | 0.8 |
| β Streptococcus II. Nonhemolytic streptococcus | 3.1 | 100 |
| Staphylococcus aureus 69 | 1.5 | >100 |
| Streptococcus hemolyticus, Group D | 3.1 | 100 |
| Bacillus cereus ATCC 10702 | 5 | 0.1 |
| Klebsiella pneumonia (Friedlanders) | 6.2 | 0.8 |
| Alcaligenes sp. ATCC 10153 (Formerly PCI 3) | 6.2 | 0.1 |
| Corynebacterium xerosis NRRL B-1397 (Lederle #119) | 0.8 | 1.5 |
| Salmonella gallinarum—Led. An. Ind. 604 | 25 | 6.2 |
| Escherichia coli | 6.2 | 1.5 |
| Klebsiella pneumonia "A" Strain AD | 3.1 | 0.8 |

[1] Fluorodexosy apo mitomycin B.

The novel antibacterial compounds of the present invention are also effective in vivo against certain standardized infections in mice such as *Staphylococcus aureus*, strain Smith. *Staphylococcus aureus*, strain Smith has been studied at the Rockefeller Institute and has been described by J. M. Smith and R. J. Dubos in Journ. Expt. Med. 103, 87 (1956). *Staphylococcus aureus*, strain Smith is coagulase positive, tellurite negative and is sensitive to tetracycline, penicillin, streptomycin, erythromycin, carbomycin, neomycin, chloramphenicol, novobiocin in vitro. Attempts have been made for phage typing of this strain, but it has been determined that it is non-typable.

Measurements of the in vivo activity of the novel compounds of the present invention were made according to the following procedure: Unit test groups consisted of 5 Carworth Farms (CF1) mice, females, and initial weights of the mice averaged 18–21 grams per mouse. Infections were produced by intraperitoneal injections of 0.5 milliliter volumes of a $10^{-2}$ trypticase soy broth (TSB) dilution of a 5-hour blood broth culture of *Staphylococcus aureus*, strain Smith, containing units as determined by plate counts. The compound being tested was administered to the test mice in graded doses. The test compound was administered as a single subcutaneous injection of 0.5 milliliter of aqueous propylene glycol containing the dosage amount, one half hour after infection. Untreated control mice die of this infection within 24 hours. Table II below indicates the number of surviving mice over the total treated at different dose levels of typical compounds of the present invention. To provide comparison, comparable values are given for tetracycline hydrochloride.

TABLE II (1) 1-Fluorodesoxy apo mitomycin A.
(2) N-methyl-1-fluorodesoxy apo mitomycin A[1].
(3) Tetracycline hydrochloride.

| Dosage in milligrams per kilogram of body weight | (1) | (2) | (3) |
|---|---|---|---|
| 4 | | 8/10 | 10/10 |
| 2 | 2/5 | 9/10 | 8/10 |
| 1 | | 7/10 | 4/10 |
| 0.5 | 3/5 | 8/10 | 1/10 |
| 0.25 | | 8/10 | 0/10 |
| 0.12 | 3/5 | 5/10 | |
| 0.06 | | 7/10 | |
| 0.03 | 2/5 | 4/10 | |
| 0.015 | | 4/10 | |
| 0.008 | 2/5 | | |
| | ED$_{50}$ approx. 0.06 | | ED$_{50}$=1–2 |

[1] 1-Fluorodesoxy apo mitomycin B.

The invention will be described in greater detail in conjunction with the following specific examples:

*Example 1.—Preparation of N-methyl mitomycin A*

A solution of 41.5 mg. of sodium bicarbonate in 1.25 ml. of water was treated with 1.25 ml. of dimethylformamide and 10 mg. of mitomycin A, then 0.5 ml. of acid-free methyl iodide was added. The mixture was stirred in a closed container for about five hours and then allowed to stand overnight at room temperature. The above reaction mixture was aerated with nitrogen to remove excess methyl iodide and then evaporated to dryness in vacuo. The residue was extracted with chloroform and the extract, after evaporation to dryness, was extracted with ether. Evaporation of the ether solution gave N-methyl mitomycin A. Further purification was effected by liquid-liquid partition chromatography. The purified product (6.8 mg.) was crystallized from carbon tetrachloride and heptane, U.V. $\lambda_{max}$ in methanol 320, 525 mµ.

*Example 2.—Preparation of N-ethyl mitomycin A*

The process of Example 1 was repeated using ethyl iodide in place of methyl iodide. N-ethyl mitomycin A was obtained.

EXAMPLE 3.—*Preparation of N-methyl mitomycin A*

A solution of mitomycin A (0.02 g.) in dimethylformamide (0.75 ml.) was treated with silver oxide (0.05 g.) and methyl iodide (0.1 ml.) and stirred for one hour at room temperature. After dilution with about four volumes of chloroform, the mixture was filtered and the filtrate was evaporated to dryness. Chromatography of this crude product gave 0.0118 g. of pure N-methyl mitomycin A.

EXAMPLE 4.—*Preparation of anhydro apo mitomycin A*

A solution of 25 mg. of mitomycin A in 3 ml. of dimethylformamide was reduced with hydrogen using 2.5 mg. PtO$_2$ catalyst until the reaction color was pale yellow. The reaction was filtered, washed with 1 ml. of dimethylformamide, and air-oxidized for 5 minutes. The solvent was removed under vacuum without heating and the crude product purified chromatographically using a cyclohexane; ethyl acetate; dimethylformamide; $H_2O$ (110;90; 40; 5) solvent system. Light orange crystals were obtained from ethyl acetate in 21% weight yield, M.P. 205–250° C. decomp.

EXAMPLE 5.—Preparation of anhydro apo mitomycin A

Twenty-five and four-tenths parts of mitomycin B were added to a suspension of 25 parts of platinum oxide in 3,000 parts of N,N-dimethylformamide under an atmosphere of hydrogen in a hydrogenation apparatus. The reaction mixture was stirred until the color changed from blue to colorless and 1 mole of hydrogen had been consumed. The catalyst was then removed by filtration through diatomaceous earth and the filtrate evaporated at low temperature and pressure. The dried residue was taken up in 1,000 parts of absolute ethanol and air bubbled through the solution for ten minutes. The orange crystals that formed after air oxidation were removed by filtration, washed with a little ethanol and vacuum dried. The yield of the crude orange crystals was 11 parts. Additional material was obtained from the mother liquor. The product was purified by recrystallization from pyridine or ethanol.

EXAMPLE 6.—Preparation of N-methyl-1-fluorodesoxy apo mitomycin A

Twelve milligrams of N-methyl anhydro apo mitomycin A is treated in a polyethylene bottle with 0.5 cc. of liquid hydrogen fluoride while moisture is carefully excluded. The mixture is then evaporated to dryness in a rapid stream of dry nitrogen and the residue is freed of traces of residual HF by storage overnight in a vacuum desiccator over sodium hydroxide. Chromatography of the residue by partition in the system heptane-ethyl acetate-methanol-water (55:45:17:4) gave a major peak in the 3rd-4th holdback volumes. The material was isolated by evaporation, washing the residue with cyclohexane, dissolution in methanol, filtration, and evaporation of the filtrate to give 10.5 mg. of active product.

EXAMPLE 7.—Preparation of N-methyl-1-fluorodesoxy apo mitomycin A from N-methyl mitomycin A N-methyl mitomycin A (0.050 g.) was dissolved in 20 ml. of methylene chloride (freshly distilled from phosphorus pentoxide). Dry pyridine (0.011 ml., 1. equiv.) was added [the use of pyridine may not be necessary] and the mixture was cooled to about 0° C. while stirring under an atmosphere of dry helium. Gaseous hydrogen fluoride was passed over the stirred solution for about one minute and, after stirring for an additional five minutes, the mixture was evaporated to dryness by aeration with a stream of helium. The orange colored residue was taken up in a little water, treated with sufficient sodium bicarbonate to give a weakly basic solution and then extracted with methylene chloride. The methylene chloride extracts were combined, dried, clarified and evaporated to dryness. This crude product was further purified by liquid-liquid partition chromatography using the solvent system heptane, acetate, methanol, water (55:45:17:4) and the fraction eluted by *about* three column volumes of the mobile phase was collected. After removal of the solvents, the residue was taken up in ether. After clarification and concentration, the product was precipitated by the careful addition of petroleum ether, giving a yellow, amorphous powder.

EXAMPLE 8.—Preparation of 1-florodesoxy apo mitomycin A

A procedure comparable to that of Example 6 was used for the reaction of mitomycin A with hydrogen fluoride in order to prepare 1-fluorodesoxy apo mitomycin A.

What is claimed is:

1. A member of the class consisting of compounds of the formula:

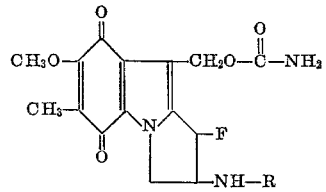

wherein R is selected from the group consisting of hydrogen and lower alkyl, and the non-toxic acid-addition salts thereof.

2. The compound 1-fluorodesoxy apo mitomycin A.
3. The compound N-methyl-1-fluorodesoxy apo mitomycin A.
4. The compound N-ethyl-1-fluorodesoxy apo mitomycin A.
5. The compound N-isopropyl-1-fluorodesoxy apo mitomycin A.
6. The compound N-n-propyl-1-fluorodesoxy apo mitomycin A.
7. The compound N-isobutyl-1-fluorodesoxy apo mitomycin A.

References Cited by the Examiner

UNITED STATES PATENTS 3,179,671  4/1965  Mowat et al. _____ 260—319

OTHER REFERENCES

Elderfield: Heterocyclic Compounds, volume 1, John Wiley and Sons, Inc., New York, 1950, pages 68–70.

NICHOLAS S. RIZZO, *Primary Examiner.*

HENRY R. JILES, *Examiner.*

MARY U. O'BRIEN, *Assistant Examiner.*